United States Patent Office 3,426,833
Patented Feb. 11, 1969

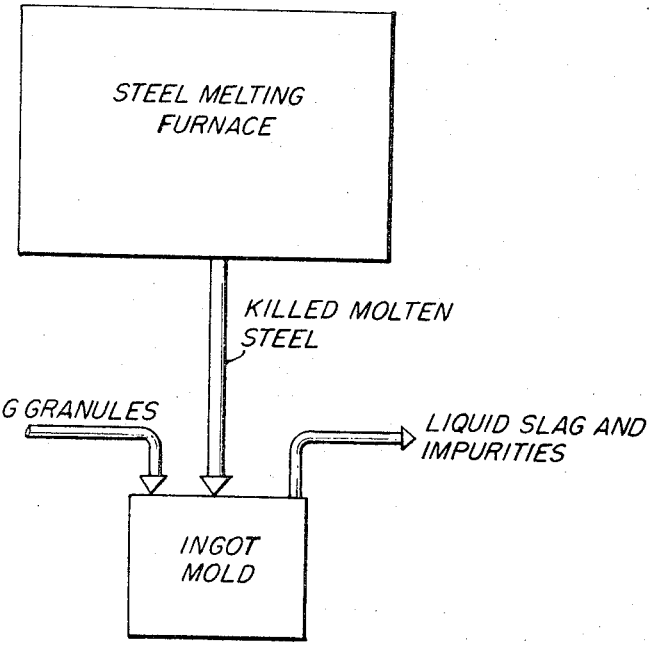
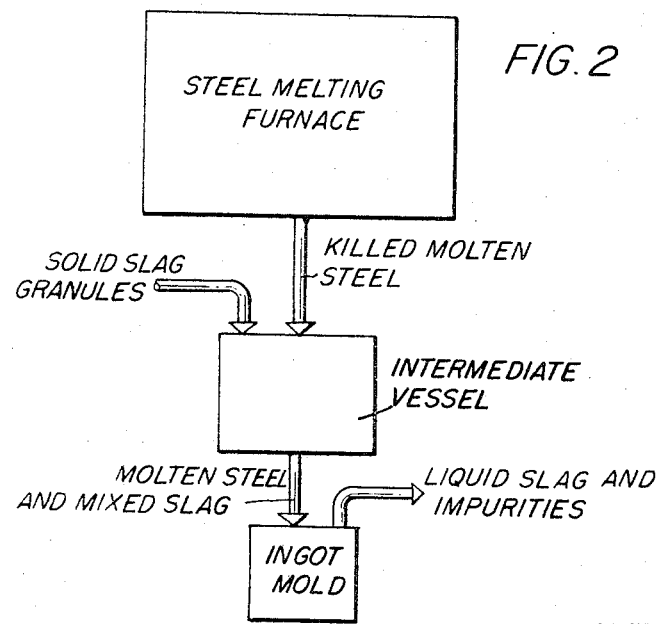

3,426,833
PROCESS FOR THE MANUFACTURE OF STEEL INGOTS
Alfred Randak, Ahornweg 5; Reinhold Eberbach, Kiefernweg 28; Heinz Rinker, Harkortplatz 2; and Helmut Treppschuh, Felstrasse, 2, all of Geisweid, Germany
Filed Nov. 12, 1964, Ser. No. 410,755
U.S. Cl. 164—56                    7 Claims
Int. Cl. B22d 27/18, 27/20; C21c 7/00

In the manufacture of steel ingots, non-metallic segregations are formed in addition to the oxidic segregations produced immediately upon the addition of the deoxidant, these non-metallic segregations being due to the fact that, as the cooling progresses, the ability of the hot metal to hold in solution gases such as oxygen, nitrogen and hydrogen is reduced. The first two elements segregate in the steel in the form of non-metallic inclusions, and, when present in excessively high percentages, they are responsible for the so-called low degree of purity.

For years foundrymen have been concerned with improving the degree of purity and many experiments and suggestions have been made for the purpose of reducing non-metallic inclusions insofar as possible.

In addition to the observation of certain conditions during the melting of the metal, the performance of deoxidation under conditions assuring an optimum reduction of the oxygen content and good segregation of the oxides has proven helpful. Furthermore, the use of the vacuum technique has lead to good degrees of purity, owing to the fact that the oxygen has been largely eliminated through the carbon monoxide reaction. The so-called Perrination process has also been performed in various ways to achieve a good degree of purity, this being a process wherein the molten steel is tapped into a ladle containing liquid reducing slag, which deoxidizes the steel.

None of these processes, however, can be of any assistance in removing segregations which develop during the subsequent cooling. This is especially true of nitrides in the case of steels containing titanium, especially stainless steels, in which segregation starts relatively late, so that the nitrides are not completely segregated, and it is also true in the case of steels containing zirconium.

Now, it is proposed by the invention to cool the steel when it is cast into molds, by the addition of solid slag, so that when this slag is separated from the still molten steel by flotation, the inclusions suspended in the steel are floated out. The cooling results in an intensified segregation of the impurities. Furthermore, the solid slag that is added is not intended to produce an additional deoxidation, but only to carry off in the slag the fine inclusions suspended in the steel, which developed during the cooling.

It is true that the treatment of steel with liquid slag during the tapping or even during the teeming has often been proposed, but these processes require an additional slag melting furnace and hence do not justify their cost. The treatment at the time of tapping is intended to produce a deoxidation, whereas the treatment at the time of teeming is intended especially to create a good ingot surface. The addition of solid slags, however, has hitherto been performed only at the time of tapping, and for the purpose of desulfuration. In this case, the highest possible reaction temperature is striven for. The addition of solid slag immediately before teeming into molds has the advantage of easy handling over the use of liquid slags and has an amazingly great effect on improving the degree of purity of the steel.

In addition to the separation of the oxidic segregations, the process of the invention achieves a removal of the nitride that forms in the case of steels containing titanium and other such steels, which results in a very good surface on the finished product, such as sheet steel, bar steel or semifinished steel. In particular, the pockets and surface defects which otherwise occur in the case of stabilized steels are completely prevented. Since these surface defects cause considerable additional expense in the working of these steels, the use of the above-described process, especially in the case of stabilized stainless steels, has proven extremely favorable as regards costs.

This process is especially suitable, too, for relatively small ingots, in which self-purification of the metal is especially difficult or impossible, due to their relatively rapid solidification—that is, ingots weighing a maximum of 3 tons, or preferably a maximum of 1 ton.

The process of the invention can be better understood by reference to the accompanying drawing, in which:

FIG. 1 is a schematic flow diagram in block form illustrating a steel purifying process according to one embodiment of the invention wherein the slag material is introduced directly into the ingot mold; and FIG. 2 is a schematic flow diagram of a steel purifying process according to another embodiment of the invention wherein the slag material is introduced into an intermediate vessel ahead of the ingot mold.

It is expedient to perform the process as follows:

In the case of bottom teeming, the addition of the solid slag can be performed in an intermediate vessel, as exemplified by FIG. 2, and such vessel can be a ladle, or a large-diameter gate or the like. Preferably the gate is replaced, in a known manner, by an iron chill which either is open at the bottom, or in which the bottom hole is bored to the diameter of the king brick. The steel is bottom-poured through this center chill into the outer chills so that, in other words, in the casting of a stool, 6 to 8 ingots are bottom-poured and 1 ingot, the center ingot, is top-poured. During the teeming, the solid slag is added to the center ingot.

In addition to the quality improvement thus obtained, this procedure results in an increased output of steel, since the runner waste is eliminated. Economy of operation is also improved by the fact that the bricking up and setting of the gates can be omitted. A further advantage in this procedure is also that the output per square meter of teeming box area can be increased.

The intermediate ladle, or large-diameter gate, or center chill, can be so wide that the solid slag added therein also separates from it again therein, that is, does not get into the chills into which the steel is bottom-poured. But if in this process the solid slag is added in a standard or somewhat narrower gate, the falling stream of steel carries this slag with it into the ingot. Now, it has been proved that, even when the slag is carried along, a complete separation of the slag takes place right in the ingot, and the non-metallic inclusions present in the steel are washed out with it.

Accordingly, the slag is added in such a narrow gate that it is carried along into the chill, and there it separates from the steel again, taking non-metallic segregations with it.

It furthermore appears that, if a heat insulating covering powder is used, during teeming the rising ingot is encased in a thin layer of the added slag, which results in an excellent surface on the ingot, on the one hand, and on the other hand reliably prevents an undesirably rapid solidification of the exterior surface of the ingot, thereby permitting the easy rising of the entrained slag in the liquid slag cover.

In the case of multiple mold castings, it is best not to begin the addition of solid slag until after the pouring of the multiple mold is begun, because this assures that the slag will be entrained in the steel and assures thorough separation thereafter.

In the case of top teeming, the solid slag is put into the mold immediately after the pouring starts as exemplified by FIG. 1.

In both types of casting, the slag is preferably added continuously until the end, so as to distribute the cooling effect uniformly over the length of the ingot. The cooling effect also results in a reduction of solubility of the dissolved gases and segregation of inclusions.

The composition of the slag used can vary within wide limits. Also, it is not essential to use synthetic slags, and the addition of a mixture of slag components or of individual slag components, like $SiO_2$, $Al_2O_3$, or $CaO$, has also proven effective. However, the use of synthetic slags has the advantage that certain uniform grain sizes can be used, resulting in an optimum floating out of the segregations that form. One advantageous grain size contains grains which are not smaller than 1 mm. and not larger than 10 mm. The slag used does not need to have a reducing character, either, since it is a completely killed steel that is being poured. However, in the case of strongly oxidizing slags, it is recommendable to increase the amount of deoxidation of the hot metal, so that the steel will not be under-deoxidized.

It is furthermore proposed to perform the steel purifying process of the invention to the continuous casting of steel.

In this case, the solid slag is to be added continuously in the tundish. It is expedient for the depth of the tundish to be greater than its diameter, preferably about equal to three times the diameter. The tundish is also best equipped in such a manner that it will be possible for the thoroughly agitated and possibly also melted slag to spill off.

The addition of the solid slag is preferably commenced after the tundish is partially filled, in order to assure a complete separation of the slag from the liquid steel in the tundish. In the casting of steel strands, it is expedient to perform the subsequent distribution of the molten steel to the individual strands, and the casting itself, under a gas shield, so as to avoid the absorption of gases such as oxygen and nitrogen.

To show the effect of extreme slag compositions in the course of the process, the two following examples are given:

EXAMPLE 1

A titanium-stabilized, austenitic steel of quality X–10 CrNiTi 18–9, SEL–No. 4541, was melted under the customary conditions in a 15-ton electric furnace. The molten metal was bottom-poured in eight ingot molds to form 1000 kilogram ingots. After pouring these ingots a 1000-kilogram ingot was top-poured and during pouring treated with 10 kilograms of slag of the following composition:

|  | Percent |
|---|---|
| $SiO_2$ | 40 |
| FeO | 3 |
| MnO | 40 |
| CaO | 9 |
| $Al_2O_3$ | 4 |
| $TiO_2$ | 0.5 |

This slag is easily reducible with 43% (MnO+FeO) and therefore it is not the best on account of possible reactions with substances which accompany steel and have an affinity for oxygen.

The surface of the top-poured ingot had a better appearance than standard top-poured ingots made from titanium-stabilized materials.

TABLE 1

| Without slag: | Percent |
|---|---|
| C | 0.08 |
| Si | 0.55 |
| Mn | 1.22 |
| P | 0.033 |
| S | 0.030 |
| Cr | 17.40 |
| Ni | 10.60 |
| Ti | 0.50 |

| With slag: | |
|---|---|
| C | 0.09 |
| Si | 0.57 |
| Mn | 1.30 |
| P | 0.035 |
| S | 0.028 |
| Cr | 17.60 |
| Ni | 10.30 |
| Ti | 0.45 |

Table 1 compares the analysis of the top-poured ingot with the analysis of the conventional ingots. The titanium loss amounted to only 10%, in spite of the high MnO+FeO content. Hence, the carbon content of the top-poured ingot is still fully bonded to titanium.

The top-poured ingot was dressed down clean with an 8.5% chip loss as compared with 8 to 10% in conventional bottom-pour production. The following shows a comparison of stepped planing tests on sheet bars.

Conventional:
- 1st step _____ A few seams, 5–20 mm. long.
- 2nd step _____ Many fine seams.
- 3rd step _____ Many coarser seams in the core.

Made with slag per the invention:
- 1st step _____ Perfect.
- 2nd step _____ Perfect.
- 3rd step _____ A few fine seams in the core.

A similar saving was achieved in touching up semifinished plates rolled down from the sheet bars:

Conventional—all plates required grinding on all sides.
Made with slag—only about half of the plates required spot grinding.

The sheets rolled from both batches were good.

EXAMPLE 2

Titanium-stabilized austenitic steel of quality X–10 CrNiTi 18–9, SEL–No. 4541, was produced. The melting was done under the customary conditions in the 15-ton electric furnace. The melt was bottom-poured into eight 1000-kilogram ingots. Thereafter another 8 ingots were bottom-poured and treated with slag in a special gate. The slag added was a mixture of 62% granulated, calcined blast-furnace slag and 38% beach sand ($SiO_2$).

The analysis of the blast furnace slag was as follows:

|  | Percent |
|---|---|
| $SiO_2$ | 33 |
| CaO | 43 |
| $Al_2O_3$ | 15 |
| S | 1.9 |
| MgO | 3.5 |

About 60 kg. of the slag mixture were added continuously to the special gate during the teeming operation. After the teeming, the slag remaining in the special gate was analyzed for titanium compounds, and an average of 6% $TiO_2$ and 4.5% TiN was found.

Table 2 shows a comparison of the analyses with and without slag treatment, of cast ingots.

TABLE 2

| Without slag: | Percent |
|---|---|
| C | 0.06 |
| Si | 0.64 |
| Mn | 1.22 |
| P | 0.034 |
| S | 0.019 |

Without slag:

| | Percent |
|---|---|
| Cr | 17.70 |
| Ni | 10.70 |
| Ti | 0.40 |

With slag:

| | |
|---|---|
| C | 0.07 |
| Si | 0.73 |
| Mn | 1.21 |
| P | 0.034 |
| S | 0.032 |
| Cr | 17.70 |
| Ni | 10.70 |
| Ti | 0.33 |

As it is apparent, an increase in the sulfur content took place, due to the high sulfur content of the blast furnace slag, but it is still within the tolerances. The titanium loss amounts to about 20% and the titanium-to-carbon bonding ratio is lower than the prescribed minimum of 5. Consequently, the ingots treated with slag were tested with special care for liability to intercrystalline corrosion, but no such liability was found.

Accordingly, lower bonding ratios are permissible in titanium-containing steels treated with slag than in conventional production, evidently because the titanium content is present in a more effective form than otherwise. Titanium oxides and titanium nitrides have been substantially floated out. While non-slag treated ingots had to be machined down with a metal loss of about 9%, the slag-treated ingots needed no more than a light grinding with a metal loss of 1 to 2%. The economic importance of the process is therefore considerable.

The stepped planing tests on sheet bars showed the following.

Without slag:
- 1st step _____ Short seams, fine.
- 2nd step _____ Many fine seams.
- 3rd step _____ Many medium to coarse seams in the core.

With slag:
- 1st step _____ Perfect; fine seams in rare cases.
- 2nd step _____ Fine seams here and there.
- 3rd step _____ Many fine seams, somewhat heavier in the core.

Microscopic examination by the Diergarten method showed the following (averages of 15 specimens):

| | Rating |
|---|---|
| Without slag | 3 |
| With slag | 0.5 |

The above findings were confirmed when the quality of the semi-finished plates and sheets made from these sheet bars was examined.

In the case of synthetic slags prepared on a basis of lime, silicic acid and alumina and made as neutral as possible, the undesirable reactions deliberately shown in the examples, such as an increase in sulfur content, do not, of course, take place. The effect on the degree of purity, however, is equal or better.

What is claimed is:

1. A process for the manufacture of steel ingots having a high degree of purity, which comprises pouring molten steel in a substantially killed condition into an ingot mold, and adding a slag material in a divided solid condition to said molten steel for intimate contact therewith to react with non-metallic impurities therein and to cool said molten steel to separate such impurities from the molten steel within the mold by floatation with the slag, said slag including at least one material species taken from the group consisting of silicon dioxide, ferrous oxide, manganous oxide, aluminum oxide, calcium oxide, magnesium oxide and titanium dioxide.

2. The process according to claim 1 wherein said killed molten steel is poured from a source thereof into an intermediate vessel, and said slag is added to the molten steel within said intermediate vessel, and said molten steel and slag are poured together in admixture from said intermediate vessel into an ingot mold wherein separation of said non-metallic impurities by floatation with the slag occurs.

3. The process according to claim 1 wherein said slag material is in the form of granules of a size ranging from 1 millimeter to 10 millimeters.

4. The process according to claim 1 wherein the amount of slag added to said molten steel is proximately 1 to 6 percent by weight.

5. The process according to claim 1 wherein said slag material is introduced into the ingot mold for admixture and reaction with the non-metallic impurities in the molten steel poured therein.

6. The process according to claim 2 wherein said slag material is continuously introduced into said intermediate vessel during the pouring of said killed molten steel into said vessel.

7. The process according to claim 5 wherein said slag material is continuously introduced into the ingot mold during the pouring thereof, beginning at a time when a quantity of killed molten steel has been introduced into said mold.

References Cited

UNITED STATES PATENTS

| | | | |
|---|---|---|---|
| 963,973 | 7/1910 | Wright | 22—215 |
| 1,814,584 | 7/1931 | Bost et al. | 22—215 |
| 2,510,154 | 6/1950 | Tanczyn | 22—215 |
| 2,510,155 | 6/1950 | Tanczyn | 22—215 |
| 2,518,738 | 8/1950 | Woods et al. | 22—215 |
| 2,983,598 | 5/1961 | Wheatley | 22—215 X |
| 3,052,936 | 9/1962 | Hamilton | 22—200.1 |
| 3,089,767 | 5/1963 | Rinesch | 22—214 X |
| 3,208,117 | 9/1965 | Goedecke et al. | 22—215 X |
| 1,646,728 | 10/1927 | Evans | 22—215 |
| 2,631,344 | 3/1953 | Kennedy | 22—200 |
| 2,493,394 | 1/1950 | Dunn et al. | 75—134 |
| 1,008,420 | 11/1911 | Lock | 75—61 |
| 1,145,506 | 7/1915 | Pasquier | 75—52 |
| 2,204,813 | 6/1940 | Muskat | 75—61 X |
| 2,305,052 | 12/1942 | Yocom | 75—52 X |
| 2,015,691 | 10/1935 | Perrin | 75—61 X |
| 2,741,556 | 4/1956 | Schwartz | 75—61 X |
| 2,767,077 | 10/1956 | Perrin | 75—61 X |
| 2,781,256 | 2/1957 | Richards | 75—52 |
| 2,040,167 | 5/1936 | Crosby | 75—61 X |
| 1,559,342 | 10/1925 | Mattice | 75—58 X |

FOREIGN PATENTS

| | | |
|---|---|---|
| 77,686 | 11/1950 | Norway. |
| 755,863 | 8/1956 | Great Britain. |
| 492,896 | 9/1937 | Great Britain. |
| 801,156 | 9/1958 | Great Britain. |
| 1,198,499 | 8/1965 | Germany. |
| 1,211,362 | 2/1966 | Germany. |

WILLIAM J. STEPHENSON, *Primary Examiner.*

V. K. RISING, *Assistant Examiner.*

U.S. Cl. X.R.

75—53, 58; 164—134